United States Patent
Wilfried et al.

(10) Patent No.: US 11,001,019 B2
(45) Date of Patent: May 11, 2021

(54) TIRE FILLING BASED ON ACRYLIC HYDROGELS

(71) Applicant: SIKA TECHNOLOGY AG, Baar (CH)

(72) Inventors: Carl Wilfried, Wädenswil (CH); Markus Haufe, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 473 days.

(21) Appl. No.: 15/737,074

(22) PCT Filed: Aug. 9, 2016

(86) PCT No.: PCT/EP2016/068935
§ 371 (c)(1),
(2) Date: Dec. 15, 2017

(87) PCT Pub. No.: WO2017/025528
PCT Pub. Date: Feb. 16, 2017

(65) Prior Publication Data
US 2018/0154595 A1    Jun. 7, 2018

(30) Foreign Application Priority Data

Aug. 13, 2015   (EP) .................................. 15180984

(51) Int. Cl.
| | | |
|---|---|---|
| *B60C 7/10* | (2006.01) | |
| *B29C 73/16* | (2006.01) | |
| *B29D 30/04* | (2006.01) | |
| *B29C 73/20* | (2006.01) | |
| *B60C 17/00* | (2006.01) | |
| *B29K 33/00* | (2006.01) | |
| *B29K 105/00* | (2006.01) | |

(52) U.S. Cl.
CPC ............ *B29C 73/163* (2013.01); *B29C 73/20* (2013.01); *B29D 30/04* (2013.01); *B60C 7/10* (2013.01); *B60C 7/102* (2013.01); *B60C 17/00* (2013.01); *B29K 2033/12* (2013.01); *B29K 2105/0061* (2013.01); *B29K 2995/0062* (2013.01)

(58) Field of Classification Search
CPC ......... B29C 73/163; B60C 7/10; B60C 7/102; B29K 2105/0061
See application file for complete search history.

(56) References Cited

U.S. PATENT DOCUMENTS

| | | | | |
|---|---|---|---|---|
| 1,535,361 | A * | 4/1925 | Von Edelkrantz | ........ B60C 7/10 106/33 |
| 3,701,374 | A * | 10/1972 | McGillvary | .......... B29D 30/06 152/564 |
| 4,094,353 | A * | 6/1978 | Ford | .......................... B60C 7/10 152/310 |
| 4,230,168 | A * | 10/1980 | Kaneda | .................. B29D 30/04 152/310 |
| 5,472,031 | A * | 12/1995 | Austin | .................. B29C 73/166 137/223 |
| 6,508,898 | B1 * | 1/2003 | Rustad | .................. B29C 73/163 152/502 |
| 7,614,865 | B1 * | 11/2009 | Steinke | .................. B29C 44/18 152/155 |
| 8,791,175 | B2 * | 7/2014 | Okamatsu | ............. B29C 73/163 523/166 |
| 9,266,388 | B2 * | 2/2016 | Schaedler | ................. B60B 9/26 |
| 2004/0154718 | A1 * | 8/2004 | Doesburg | ............... B29D 30/04 152/310 |
| 2004/0260396 | A1 * | 12/2004 | Ferree | ..................... A61F 2/446 623/17.12 |
| 2005/0008727 | A1 | 1/2005 | Danules et al. | |
| 2006/0041052 | A1 | 2/2006 | Utsunomiya | |
| 2012/0118199 | A1 * | 5/2012 | Lam | ..................... B29C 73/163 106/33 |
| 2013/0172465 | A1 | 7/2013 | Okamatsu et al. | |
| 2014/0187855 | A1 * | 7/2014 | Nagale | ................. A61K 9/0034 600/37 |
| 2014/0221527 | A1 * | 8/2014 | Naruse | ................. B29C 73/163 523/166 |
| 2015/0031790 | A1 * | 1/2015 | Obrecht | ............... C08K 5/0025 523/156 |
| 2016/0040052 | A1 * | 2/2016 | Okamatsu | ............ B29C 73/163 524/388 |

FOREIGN PATENT DOCUMENTS

| | | |
|---|---|---|
| CN | 102906213 A | 1/2013 |
| DE | 102013005577 A1 | 10/2014 |
| WO | 00/61655 A1 | 10/2000 |

OTHER PUBLICATIONS

Heinz-Herman Greve, "Rubber 2. Natural," in 31 Ullmann's Encyclopedia of Industrial Chemistry 583, published online 2000.*

(Continued)

*Primary Examiner* — Nicholas E Hill
(74) *Attorney, Agent, or Firm* — Oliff PLC

(57) ABSTRACT

A method for producing a tire filled with a (meth)acrylic hydrogel, the method comprises a) providing a mixture comprising at least one water-soluble (meth)acrylic compound, water and an initiator, and b) filling the mixture in a tire in which the mixture polymerizes to form the (meth)acrylic hydrogel. The tire filling material is suitable for producing flat proof tires, enables fast and controlled cure and is insensitive towards dosage errors. Moreover, the tire filling material is environmental friendly and cost effective.

16 Claims, No Drawings

(56) References Cited

OTHER PUBLICATIONS

Aug. 5, 2019 Office Action issued in Chinese Patent Application No. 201680043397.X.
Nov. 12, 2018 Office Action issued in Chilean Patent Application No. 201800199.
Oct. 18, 2016 International Search Report issued in International Patent Application No. PCT/EP2016/068935.
Oct. 18, 2016 Written Opinion issued in International Patent Application No. PCT/EP2016/068935.
Mar. 17, 2020 Office Action issued in Chinese Patent Application No. 201680043397.

* cited by examiner

TIRE FILLING BASED ON ACRYLIC HYDROGELS

TECHNICAL FIELD

The invention relates to tire filling compositions.

BACKGROUND OF THE INVENTION

Tire fillings are known for a long time. They are used in demanding applications such as underground mining, farming or scrap yards, where flat proofing is important, but customers do not want to switch to solid tires. Solid tires are relatively expensive and are only available in limited sizes. With a tire filling, any tire of any size on any vehicle can be transformed into a flat proof tire.

Up to now, these tire fillings have been realized by polyurethanes, since polyurethane allow for a combination of softness, elasticity and cure speed. Softness is required to provide a reasonably comfortable ride, and is typically represented by a hardness between 5 and 20 Shore A. For some applications, e.g. higher speeds, higher hardness up to 50 Shore A are available on the market.

These tire filling systems are typically delivered as a ready-to-use kit to the customer. In order to get a reasonably short cure time, a 2 component polyurethane and a static mixer with a pressure pump are provided. The customer put the tire in an upright position (valve down), drills a hole into the top, connects the pressure unit to the valve, and fills the tire until material leaks out of the top hole. After the filling, the hole is closed by a screw or any other suitable method.

For instance, WO 00/61655 describes a method for producing a deflation-proof tire by filling a tire with a composition comprising a polyisocyanate, a high molecular weight polyol, a polar plasticizing extender oil, a polyamine which is then cured in the presence of a catalyst to form a polyurethane elastomer having a Shore A hardness in the range of about 5 to 60.

Polyurethane is used as the standard material for tire filling up to now, because it combines suitable hardness with fast cure and a reasonable price. However, this approach has some serious drawbacks.

Thus, the polyurethane filling is usually prepared by polymerization of a polyisocyanate component and a polyol component and the ratio of these two components has to be controlled precisely, in order to achieve an acceptable curing of the system. Any deviation will lead to a material that does not fulfill the basic requirements for a tire filling. In particular, any liquid contents of the tire has to be avoided, since it will leach out, which then leads to excessive heat generation during use, and finally destruction of the tire.

Moreover, the polyurethane fillings are usually based on two component compositions which are of some concern regarding environment, health and safety (EHS). There is a risk that the customer gets in direct contact with isocyanate. In order to reach the desired softness, the components are heavily plasticized with e.g. aromatic oils which are also of strong concern.

A further disadvantage of polyurethane tire fillings is that the costs are still relatively high because all starting materials are organic compounds.

SUMMARY OF THE INVENTION

Accordingly, an object of the present invention was to provide an alternative tire filling material for producing flat proof tires which enables fast and controlled cure and is insensitive towards dosage errors. Moreover, the tire filling material should be environmental friendly and cost effective.

Surprisingly, it was found that (meth)acrylic hydrogels provide a means to flat proof tires with a composition that has water as a main component.

Accordingly, the present invention provides a method for producing a tire filled with a (meth)acrylic hydrogel, the method comprises a) providing a mixture comprising at least one water-soluble (meth)acrylic compound, water and an initiator, and b) filling the mixture in a tire in which the mixture polymerizes to form the (meth)acrylic hydrogel.

The inventive method is a robust, cost effective and environmental friendly method and represents an alternative to conventional polyurethane tire filling technology. Surprisingly, a fast and controlled cure of the tire filling mixture can be achieved. The curing characteristics are insensitive towards dosage errors so that processing is very easy. Moreover, the tire filling is environmental friendly, since it is plasticized by water, and very cost effective, since water is a main component.

The invention is also related to a tire filled with a (meth)acrylic hydrogel, the use of a mixture as tire filling material and to the tire filling material as described in the further independent claims. Preferred embodiments of the invention are recited in the dependent claims.

DETAILED DESCRIPTION OF THE INVENTION

A (meth)acrylic hydrogel is a water containing gel which contains hydrophilic (meth)acrylic polymer. In particular, the hydrophilic (meth)acrylic polymer in the hydrogel is usually crosslinked, e.g. via covalent bonds (chemical gel) or via non-covalent bonds such as ionic interaction or hydrogen bonds (physical gel). A (meth)acrylic polymer is a polymer of one or more acrylic and/or methacrylic compounds or monomers, respectively, and optionally one or more comonomers copolymerizable with the acrylic and/or methacrylic compounds or monomers, respectively.

(Meth)acrylic means methacrylic or acrylic. Accordingly, (meth)acryloyl means methacryloyl or acryloyl. A (meth)acryloyl group is also known as (meth)acryl group. A (meth)acrylic compound comprises one or more (meth)acryloyl groups.

A water soluble compound, e.g. a water-soluble (meth)acrylic compound, refers to a compound having a solubility of at least 5 g/100 g water at 20° C.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "open time" is understood to mean the duration of processability when the ingredients are mixed with each other. The end of the open time is usually associated with viscosity increase of the mixture or composition such that processing is no longer possible.

The method of the invention for producing a tire filled with a (meth)acrylic hydrogel comprises in a first step the provision of a mixture comprising at least one water-soluble (meth)acrylic compound, water and an initiator.

The mixture contains one or more water soluble (meth) acrylic compounds, i.e. the (meth)acrylic compound has a solubility of at least 5 g/100 g water at 20° C. The (meth) acrylic compound preferably has a solubility of at least 10 g/100 g water, at 20° C. Most preferably water and the (meth)acrylic compound may be soluble in each other, i.e. they form a homogenous phase at any mixing ratio.

The (meth)acrylic compound used is water-soluble in order to achieve the hydrogel upon polymerization. (Meth) acrylic compounds which are not water-soluble cause separation of the water from the (meth)acrylic polymer formed.

The (meth)acrylic compound may be a monomer, an oligomer or a polymer. The (meth)acrylic compound may have e.g. a molecular weight or, if it is an oligomer or polymer with a molecular weight distribution, a weight average molecular weight of not more than 12000 g/mol, preferably not more than 8000 g/mol and more preferably not more than 4000 g/mol. The weight average molecular weight can be determined by gel permeation chromatography (GPC) with a polystyrene standard.

The water-soluble (meth)acrylic compound may have one, two or more than two (meth)acryloyl groups. The water-soluble (meth)acrylic compound preferably has one or two (meth)acryloyl groups.

The mixture preferably comprises at least one (meth) acrylic compound having one (meth)acryloyl group and/or at least one (meth)acrylic compound having two (meth) acryloyl groups. (Meth)acrylic compounds having three or more (meth)acryloyl groups may be contained in addition, but this is usually not preferred.

It is preferred that the mixture comprises at least one water-soluble (meth)acrylic compound having one (meth) acryloyl group or that the mixture comprises at least one water-soluble (meth)acrylic compound having one (meth) acryloyl group and at least one water-soluble (meth)acrylic compound having two (meth)acryloyl groups. The mixture may additionally contain (meth)acrylic compounds having three or more (meth)acryloyl groups, but this is usually not preferred.

The water-soluble (meth)acrylic compound is preferably selected from at least one of a hydroxyl-functional (meth) acrylate, a carboxyl-functional (meth)acrylic compound, a salt or an anhydride of a carboxyl-functional (meth)acrylic compound, a polyether (meth)acrylate, a (meth)acrylamide, a (meth)acrylate having a sulfonic acid group, a (meth) acrylamide having a sulfonic acid group, a salt or an ester of a (meth)acrylate having a sulfonic acid group or of a (meth)acrylamide having a sulfonic acid group, a (meth) acrylate having a quaternary nitrogen containing group and a (meth)acrylamide having a quaternary nitrogen containing group or mixtures thereof.

The cation for the salts mentioned above and below may be any common cation used in such compounds. Suitable examples are metal salts, in particular alkali metal salts or earth alkaline metal salts, such as sodium salts, potassium salts or magnesium salts, or ammonium salts.

A hydroxyl-functional (meth)acrylate is a (meth)acrylate having one or more hydroxyl groups. Examples of suitable hydroxyl-functional (meth)acrylates are hydroxyethylmethacrylate (HEMA), hydroxyethylacrylate (HEA), hydroxypropylmethacrylate (HPMA), hydroxypropylacrylate (HPA), hydroxybutylmethacrylate (HBMA) and hydroxybutylacrylate (HBA).

A carboxyl-functional (meth)acrylic compound is a (meth)acrylic compound having one or more carboxylic groups such as e.g. (meth)acrylic acids or (meth)acrylic acids having one or more additional carboxylic groups. Examples of suitable carboxyl-functional (meth)acrylic compounds and anhydrides thereof are methacrylic acid, methacrylic anhydride, acrylic acid, acrylic anhydride, itaconic acid, maleic acid, maleic anhydride, adduct of hydroxyethylmethacrylate and maleic anhydride.

Examples of suitable salts of carboxyl-functional (meth) acrylic compounds are salts of (meth)acrylic acids such as sodium acrylate, sodium methacrylate, potassium acrylate, potassium methacrylate, magnesium diacrylate and magnesium dimethacrylate.

Polyether (meth)acrylates are polyethers having one, two, three or more (meth)acrylate groups, respectively, preferably at the terminal ends thereof, wherein the polyether is preferably a polyethylene glycol (PEG), a methoxy polyethylene glycol (MPEG), a polyethylene glycol polpropylene glycol (PEG/PPG) copolymer, in particular block copolymer, an ethoxylated trimethylolpropane or an ethoxylated pentaerythritol. When the polyether is a PEG/PPG copolymer or blockcopolymer, respectively, the amount of PEG therein is preferably at least 40% by weight, in order to achieve a suitable water solubility. The polyether (meth) acrylate is preferably a polyether having one (meth)acrylate group or a polyether di(meth)acrylate.

Polyether (meth)acrylates and polyether di(meth)acrylates also include polyethers having one, two or more (meth)acrylate groups, respectively, wherein the polyether includes further structural units such as urethane groups, e.g. oligomers or prepolymers obtained by reaction of polyetherpolyols, in particular polyetherdiols, or polyethermonools with compounds having two functional groups which are reactive to hydroxyl groups such as polyisocyanates. For instance, polyether (meth)acrylates and polyether di(meth) acrylates may be obtained by reaction of polyetherpolyols or polyethermonools such as PEG, PEG/PPG block copolymers or MPEG with polyisocyanates to obtain an isocyanate-functional product which is subsequently reacted with a hydroxyl-functional (meth)acrylic compound such as hydroxyethyl methacrylate. With respect to water solubility, also in this case the PEG/PPG block copolymer preferably has an amount of PEG of at least 40% by weight.

Examples of suitable polyether (meth)acrylates and polyether di(meth)acrylates are PEG-di(meth)acrylates such as PEG 200 dimethacrylate, PEG 400 dimethacrylate, PEG 600 dimethacrylate, PEG 2000 dimethacrylate, MPEG-(meth)acrylates such as MPEG 350 (meth)acrylate, MPEG 550 (meth)acrylate, MPEG 1000 (meth)acrylate and MPEG 2000 (meth)acrylate.

Examples of suitable ethoxylated trimethylolpropane (meth)acrylates and ethoxylated pentaerythritol (meth)acrylates are an ethoxylated trimethylolpropane tri(meth)acrylate or an ethoxylated pentaerythritol tetra(methacrylate). Such compounds are commercially available, e.g. from Sartomer Americas, USA, e.g. SR415 which is ethoxylated (20) trimethylolpropane triacrylate (20 mole ethoxylated per mole TMP), SR454 which is ethoxylated (3) trimethylolpropane triacrylate (3 mole ethoxylated per mole TMP) or SR494 which is ethoxylated (4) pentaerythritol tetraacrylate (4 mole ethoxylated per mole PE).

Examples of suitable (meth)acrylates or (meth)acrylamides having a sulfonic acid group, and salts or esters thereof are 2-acrylamido-2-methylpropane sulfonic acid (AMPS®) or the sodium salt of 2-acrylamido-2-methylpropane sulfonic acid (Na-AMPS®) and sulfatoethyl methacrylate.

Examples of suitable (meth)acrylates or (meth)acrylamides having a quaternary nitrogen containing group are 2-trimethylammoniumethyl methacrylate chloride and 3-trimethylammoniumpropyl methacrylamide chloride.

Preferred (meth)acrylic compounds are a hydroxyl-functional (meth)acrylate, a salt of a carboxyl-functional (meth) acrylic compound, a polyether (meth)acrylate or a polyether di(meth)acrylate or a combination of at least two thereof, wherein a hydroxyl-functional (meth)acrylate is particularly preferred.

Particular preferred embodiments are a mixture comprising a hydroxyl-functional (meth)acrylate, a mixture comprising a hydroxyl-functional (meth)acrylate, and a salt of a carboxyl-functional (meth)acrylic compound or a mixture comprising a hydroxyl-functional (meth)acrylate and at least one of a polyether (meth)acrylate or a polyether di(meth)acrylate.

Further preferred embodiments are mixtures wherein the at least one (meth)acrylic compound is
  a) at least one hydroxyl-functional (meth)acrylate and
  b) at least one of a polyether (meth)acrylate, a polyether di(meth)acrylate and a carboxyl-functional (meth)acrylic compound,
  wherein the weight ratio of a):b) is in the range of 5:1 to 2:1, preferably 4:1 to 2:1, wherein the carboxyl-functional (meth)acrylic compound is preferably an alkali metal salt of (meth)acrylic acid, in particular sodium acrylate.

The mixture may optionally comprise one or more water soluble comonomers which are copolymerizable with the acrylic and/or methacrylic compounds or monomers, respectively. In particular, the water soluble comonomer has a solubility of at least 5 g/100 g water at 20° C. It goes without saying that the water soluble comonomer is different from the the acrylic and/or methacrylic compounds. The water soluble comonomer is preferably a vinyl compound such as a vinyl ester, a divinyl ester, a vinyl ether or a divinyl ether, preferably a hydroxyl-functional vinyl ether or a hydroxyl-functional divinylether.

The one or more water soluble comonomers, if used, are preferably used in relatively low amounts with respect to the acrylic and/or methacrylic compounds, e.g. in an amount of not more than 15% by weight, preferably not more than 5% by weight, more preferably not more than 1% by weight, based on the total amount of acrylic and/or methacrylic compounds and water soluble comonomers contained in the mixture. It is preferred that the mixture does not contain water soluble comonomers.

In addition, the mixture comprises water.

The mixture further comprises an initiator. The initiator serves to initiate polymerization of the (meth)acrylic compounds. These initiators are known to those skilled in the art. The initiator may be e.g. an organic or inorganic hydroperoxide, an organic or inorganic peroxide such as a peroxydisulfate or persulfate salt, an azo compound or any other material, which is known to the expert of being capable to generate radicals.

Examples of suitable initiators are azobisisobutyronitrile (AIBN), hydrogen peroxide, dibenzoylperoxide, cumene hydroperoxide, tert-butyl hydroperoxide, diisopropylbenzene hydroperoxide, sodium persulfate (NAPS), potassium persulfate or ammoniumpersulfate.

The mixture may optionally comprise an accelerator. It is preferred that the mixture comprises an accelerator. The accelerator is suitable to accelerate polymerization of the (meth)acrylic compounds. The accelerating effect of the accelerator may be e.g. based on interaction with the initiator promoting radical generation. The skilled person is familiar with such accelerators. The initiator may be e.g. an amine such as a tertiary amine or an aromatic amine, ascorbic acid or an inorganic or organic transition metal compound, e.g. of Mn, Fe, V, Ni or Co, wherein the inorganic or organic transition metal compound may be e.g. a transition metal salt such as a metal soap or a transition metal complex.

Specific examples of suitable accelerators are triethanolamine, N,N-dimethyl-p-toluidine, N-ethoxylated derivatives of N,N-dimethyl-p-toluidine such as N,N-bis-(2-hydroxyethyl)-para-toluidine (e.g. Bisomer® PTE of GEO Speciality Chemicals, USA), ascorbic acid, inorganic or organic Fe-compounds such as inorganic Fe salts, organic Fe salts such as Fe soaps, e.g. Fe stearate, Fe complexes, inorganic or organic Mn compounds such as inorganic Mn salts, organic Mn salts such as Mn soaps, e.g. Mn stearate, Mn complexes, dimethylaminopropyl methacrylamide (DMAPMA) or dimethylaminoethyl methacrylate (DMAEMA).

An appropriate selection of the accelerator generally depends on the initiator used and the skilled person is familiar with suitable combinations. For instance, aromatic amines are suitable accelerators for dibenzoyl peroxide, transition metal compounds are suitable accelerators for organic or inorganic hydroperoxides, and tertiary amines such as triethanolamine or DMAPMA are suitable accelerators for persulfate salts. The combinations of initiator and accelerator are often redox systems (e.g. $Fe^{2+}/H_2O_2$).

The mixture may optionally comprise an antifreezing agent. The purpose of the antifreezing agent is to avoid freezing of the gel at low temperatures. The antifreezing agent is preferably a water soluble antifreezing agent. The antifreezing agent preferably has a solubility of at least 5 g/100 g water, more preferably at least 10 g/100 g water, at 20° C.

Examples of a suitable antifreezing agent, preferably water soluble antifreezing agent, are calcium chloride, magnesium chloride, soda, sodium chloride, 2-propanol, ethylene glycol and propylene glycol, wherein propylene glycol is particularly preferred.

In a particular preferred embodiment the at least one (meth)acrylic compound is at least one hydroxyl-functional (meth)acrylic compound and the mixture comprises an antifreezing agent.

The mixture may optionally contain inhibitors. Inhibitors are often added to (meth)acrylic compounds, in particular in commercial products, in order to avoid spontaneous polymerization and/or to adjust open times and reaction times, respectively.

Apart from the above mentioned ingredients, the mixture may optionally contain one or more further additives, which are common in this field. Examples are aqueous polymer dispersions or polymer latices such as ethylene-vinylacetate dispersions or acrylic dispersions, color dyes, water soluble diluents or fillers, respectively, such as polyethylene glycol and water insoluble fillers. Color dyes may be suitable to label the mixture. However, incorporation of diluents or fillers is usually not preferred, because they may interfere with the mixture, in particular by deposition. In this regard, the water insoluble filler, if used, is preferably a water insoluble filler having a density of 0.9 to 1.1 g/ml. The water insoluble filler preferably has a solubility of less than 0.5 g/100 g water, more preferably less than 0.1 g/100 g water, at 20° C.

A benefit of the invention is that it is not necessary that the mixture contains a plasticizer such as aromatic oils in order to reach the desired softness because according to the invention such softness can surprisingly be achieved by water. Therefore, the mixture preferably does not contain a plasticizer such as an aromatic oil.

The mixture preferably contains, based on the total weight of the mixture;
  i) from 20 to 80% by weight, preferably 30 to 70% by weight, of water, and ii) from 80 to 20% by weight, preferably 70 to 30% by weight, of water-soluble (meth)acrylic compound.

The amount of the initiator in the mixture may be e.g. from 0.1 to 3% by weight, preferably 0.2 to 2.2% by weight. If present, the amount of an accelerator in the mixture may be e.g. from 0.1 to 2.5% by weight, preferably 0.3 to 1.5% by weight.

If present, the amount of an antifreezing agent in the mixture may be e.g. in the range of 5 to 60% by weight, preferably 10 to 40% by weight and more preferably 10 to 35% by weight.

The main components of the mixture with respect to quantity are water and the at least one (meth)acrylic compound. If used, the antifreezing agent may also be used in significant amounts.

The total weight of the at least one water-soluble (meth) acrylic compound and water is e.g. in the range of 99.8 to 40% by weight, preferably 99.5 to 50% by weight, based on the weight of the mixture. The total weight of the at least one water-soluble (meth)acrylic compound, water and, if present, the antifreezing agent is e.g. in the range of 99.8 to 50% by weight, preferably 99.5 to 60% by weight, more preferably 99.8 to 80% by weight, and still more preferably 99.5 to 90% by weight, based on the weight of the mixture.

The weight ratio of the at least one (meth)acrylic compound to water in the mixture is e.g. in the range of 0.3 to 4, preferably 0.6 to 2.

The ingredients of the mixture may be added in any order to provide the mixture. The mixing step is usually carried out by combining the ingredients with mixing or stirring. Suitable means for mixing are a mixer, in particular a static mixer, a two component pump or a container equipped with a stirrer. For instance, the ingredients can be mixed in a mixer, e.g. when the open time is relatively short, or in a container under stirring, e.g. when the open time is relatively long.

The ingredients of the mixture are preferably stored and delivered as a ready-to-use kit in form of a two component composition or a three component composition, wherein a part or the complete portion of water for the mixture is optionally added separately. Thus, in the two component composition, for instance, one component comprises the at least one (meth)acrylic compound and optionally the accelerator, and the other component comprises the initiator. Alternatively, (meth)acrylic compound, initiator, and accelerator, if used, are each included in a separate component in the three component composition.

A part or the complete portion of water may be included in one or more components of the two component composition or the three component composition, respectively, as appropriate. It is however preferred that at least a portion of water for the mixture is not included in the two or three component composition and that the residual water amount or the entire water amount is added on site where mixing of the two or three component composition is carried out. Thus, transport costs can be reduced significantly.

The viscosity of the mixture at the beginning is usually relatively low, since the mixture is mainly based on water and water soluble ingredients. The viscosity can be adjusted, e.g. by adjusting the ratio of water to (meth)acrylic compound, the molecular weight of the (meth)acrylic compound and/or crosslinking degree of final gel depending on the proportion of polyfunctional (meth)acrylic compounds used, if any.

Polymerization is preferably radical polymerization. The polymerization preferably takes place at ambient temperatures, e.g. in the range of −10 to 60° C., preferably 0 to 50° C.

Upon mixing the ingredients, polymerization reaction starts. Therefore, the filling step should be started soon after provision of the mixture and within the open time of the mixture. Alternatively the components of the injection material can be mixed with a static or dynamic mixer during the filling process. In the filling step the mixture is filled in a tire in which polymerization continues to form the (meth)acrylic hydrogel. The open time depends on the ingredients and the proportions thereof, but may be e.g. in the range of 3 to 90 min.

The tire to be filled can be any conventional tire. The tire is preferably a pneumatic tire. Also a semi-pneumatic tire may be suitable. The tire is preferably a tire for transportation vehicles. The tire may be e.g. an automobile tire, a bicycle tire, a motorcycle tire, a truck tire, an aircraft tire, an off-the-road tire, a farm trailer tire, a tire for heavy duty vehicles, a tire for a forestry vehicle or a tire for building machinery.

The mixture can be filled in the tire by any conventional procedure known by the skilled person. It is preferred that the cavity of the tire is fully filled with the mixture. The tire is usually mounted on the rim when the mixture is filled in the tire. The mixture is preferably filled in the tire under pressure, e.g. by means of a pressure pump or a filling pump. A two component pump is suitable to accomplish mixing of the ingredients of the mixture and to provide filling pressure with one device.

The mixture is filled in the tire through an opening, preferably the tire valve. However, the opening may be also any other opening which is provided in the tire. Usually, a second opening is provided in the tire in order to allow the air in the tire to escape and/or to control completion of filling. Accordingly, the mixture is preferably filled in the tire, which is usually mounted on the rim, through the tire valve with pressure. When the mixture leaks out of the second opening provided in the tire, filling is complete. The second opening can be closed thereafter with a sealing means such as a screw or a sealing material.

The following is an illustrative example for a suitable filling procedure. The tire mounted on the rim is put in an upright position with the valve down, a hole is drilled into the top of the tire. A pressure pump is connected to the tire valve, and the tire is filled with the mixture until material leaks out of the top hole. After filling has been completed, the hole is closed by a screw or any other suitable means.

The polymerization of the mixture filled in the tire continues and eventually causes gelation so that a (meth)acrylic hydrogel is formed in the tire. In particular, the tire filling represents a water-swollen hydrogel. In particular, the hydrogel formed is a continuous hydrogel. The (meth) acrylic hydrogel formed is soft due to the presence of water. No plasticizer is necessary.

The Shore A hardness at 23° C. of the (meth)acrylic hydrogel is e.g. not more than 50, preferably not more than 20, e.g. in the range of 5 to 50, preferably 5 to 20, as measured according to DIN 53505. The (meth)acrylic hydrogel has preferably a shore A hardness at −10° C. of not more than 60, as measured according to DIN 53505.

The rebound resilience of the (meth)acrylic hydrogel is e.g. in the range of 20 to 80%, preferably 30 to 80%, measured according to DIN 53512.

According to the invention, any tire can be transformed into a run-flat tire or non-pneumatic tire, respectively, filled with the hydrogel and is thus completely resistant against pressure loss due to cuts or damages. The (meth)acrylic hydrogel combines the additional advantages that it is cheap due to the high amount of water, is EHS uncritical, and provides a robust application since the process is tolerant regarding dosage variations.

Accordingly, the invention provides a tire filled with the (meth)acrylic hydrogel which is a run-flat tire or non-pneumatic tire. The tire filled with a (meth)acrylic hydrogel is obtainable by the inventive method as described above. Examples of suitable tires have been mentioned.

The tire filled with the (meth)acrylic hydrogel to provide flat proofing is particular suitable for bicycle tires or in demanding applications or heavy duty applications on harsh surfaces, e.g. in off-road applications or applications in underground mining, farming or scrap yards, where flat proofing is important. The inventive tire can provide an alternative to solid tires.

Accordingly, the mixture comprising one or more water-soluble (meth)acrylic compounds, water and an initiator as described above is suitable as a tire filling material. The invention is also directed to a tire filling composition comprising one or more water-soluble (meth)acrylic compounds, water and an initiator. The tire filling composition corresponds to the mixture as described above. All indications with respect to the mixture also refer to the tire filling composition.

EXAMPLES

The followings compounds and products, respectively, were used in the examples:

The tire filling compositions were tested according to the following test methods. The results are also given in Tables 1 to 3. The term "nd" means that the value was not determined.

Viscosity

The viscosity was tested on the mixture wherein the initiator (NAPS) was not included so that no polymerization took place. A qualitative analysis was carried out by observing the flow behavior of the mixture. All mixtures show low viscosity, namely <200 mPa·s at 23° C., as measured by viscometer Physical MCR101 according to ISO 3219 with a coaxial cylinder measuring system at a taper angle of 120°.

Gelling Time (min)

The gelling time at 23° C. is determined by visual inspection (gel time is achieved at the time when gel-like structures are detected).

Temperature Rise

The polymerization in the mixture is an exothermic reaction. The temperature rise (T rise) refers to the maximum temperature (° C.) reached in 100 g of the mixture during polymerization measured by a thermometer.

Since the exothermic polymerization reaction mainly occurs in the tire and the tire could be damaged by too high temperatures the temperature rise should be as low as possible.

Gel Consistency

The gel consistency of the hydrogel obtained was tested haptically.

Water Absorption

It was visually observed whether the entire amount of water in the mixture was absorbed by the hydrogel obtained and whether the hydrogel maintained the water thereafter.

| HEMA | Hydroxyethyl methacrylat (HEMA) including 400 ppm hydrochinon monomethylether (HMME) as inhibitor | |
|---|---|---|
| MPEG350MA | methoxy polyethyleneglycol methacrylate, average molecular weight 430 g/mol | Bisomer ® MPEG350MA, Geo Specialty Chemicals, Inc., USA |
| Miramer | di-funktional acrylate urethane prepolymer, 92.5% in water, Mw 3240 g/mol, Mn 1435 g/mol | Miramer ® WS2601, Miwon Specialty Chemical Co., Ltd., Korea |
| Sartomer | polyethylene glycol (600) dimethacrylate, molecular weight 736 g/mol | Sartomer ® SR252, Sartomer, France |
| QM203 | Magnesium diacrylate (diluted with water to yield a 50 wt. % solution) | CAS # 5698-98-6 |
| SMA | Sodium methacrylate, powder | CAS # 5536-61-8 |
| Na-AMPS | sodium salt of AMPS ® (2-Acrylamido-2-methylpropane sulfonic acid), 50% solution in water | AMPS ® 2405 Monomer, Lubrizol |
| TEA | triethanolamine (technical grade 85% TEA/ 15% DEA) | Triethanolamin 85, Ineos Oxide |
| NAPS | sodium persulfate (diluted with water to yield a 20 wt. % solution) | CAS # 7775-27-1 |
| Creabloc | acrylic polymer | Superabsorber, Creabloc |
| SIS | | SIS, Evonik |
| PG | Propylene glycol | CAS # 57-55-6 |

Tire filling compositions TF1 to TF24 were prepared by mixing ingredients with a static mixer to provide a mixture. The ingredients and the amounts used are given in Tables 1 to 3. The amounts are given in parts by weight (pbw). In each tire filling compositions TF1 to TF23 polymerization started when the ingredients were mixed and the mixture was finally transformed into a hydrogel.

TF24 is a reference example wherein a solid acrylic polymer which is used as a superabsorber was tested. The reference example revealed that only a soaked powder was obtained when the solid acrylic polymer powder was mixed with water. A continuous hydrogel was not obtained.

Shore A hardness

Shore A hardness of the hydrogel obtained was measured according to DIN 53505 at 23° C., −10° C. and −20° C., respectively.

Rebound Resilience

The rebound resilience of the hydrogel obtained was measured according to DIN 53512.

In Examples TF1 to TF9 the influence of higher molecular weight (meth)acrylic compounds and difunctional (meth)acrylic compounds on viscosity, gel time, temperature rise and gel consistency of the mixtures was tested. It was found that acceptable hydrogels can be formed in each case.

In Examples TF10 to TF13 the effect of increased water content was tested. It was found that acceptable hydrogels can be formed in each case. However, while in Examples TF10 and TF11 the hydrogel was stable also when pressure was applied, the hydrogels of Examples TF12 and TF13 having a relatively high water content exhibit water discharge on application of pressure.

Examples TF14 to TF19 show that increased water absorbing capabilities can be achieved when a part of the (meth)acrylic compounds used was a salt of a carboxylic group containing or a sulfonic acid group containing (meth)acrylic compound. The best results were obtained with sodium methacrylate, wherein the hydrogel of TF16 exhibited no water discharge on application of pressure.

In Examples TF20 to TF23 the influence of antifreezing agent on the characteristics was tested. It was found that partial replacement of water by the antifreezer does not significantly affect the properties.

TABLE 1

|  | TF 1 | TF 2 | TF 3 | TF 4 | TF 5 | TF 6 | TF 7 | TF 8 | TF 9 |
|---|---|---|---|---|---|---|---|---|---|
| Ingredients |  |  |  |  |  |  |  |  |  |
| HEMA (pbw) | 40 | 30 | 20 | 10 |  | 30 | 27.5 | 20 | 17.5 |
| MPEG350MA (pbw) |  |  |  |  |  | 10 | 10 | 20 | 17.5 |
| Miramer (pbw) |  | 10 | 20 | 30 | 40 |  |  |  |  |
| Sartomer (pbw) |  |  |  |  |  |  | 2.5 |  | 5 |
| Water (pbw) | 9.5 | 9.5 | 9.5 | 9.5 | 9.5 | 9.5 | 9.5 | 9.5 | 9.5 |
| TEA (pbw) | 0.5 | 0.5 | 0.5 | 0.5 | 0.5 | 0.5 | 0.5 | 0.5 | 0.5 |
| Water (pbw) | 48 | 48 | 48 | 48 | 48 | 48 | 48 | 48 | 48 |
| NAPS (pbw) | 2 | 2 | 2 | 2 | 2 | 2 | 2 | 2 | 2 |
| Total (pbw) | 100 | 100 | 100 | 100 | 100 | 100 | 100 | 100 | 100 |
| Results |  |  |  |  |  |  |  |  |  |
| Viscosity (without NAPS) | low viscosity | low viscosity | low viscosity | low viscosity | low viscosity | low viscosity | low viscosity | low viscosity | low viscosity |
| Gelling time at 23° C. (min) | 30 | 22 | 23 | 16 | 16 | 43 | 29 | 43 | 29 |
| T rise (100 g mixture) (° C.) | 59 | 54 | 52 | 46 | 37 | 54 | 49 | 48 | 48 |
| Gel consistency | rubber | rubber | rubber | hard/waxy/ somewhat deformable | hard/waxy/ hardly deformable | rubber | rubber | rubber/ soft | rubber/ hard |
| water perfectly absorbed? | yes | yes | secretion after some min | secretion after some min | secretion after some min | yes | yes | yes | yes |
| shore A hardness at 23° C. | 3.5 | 3 | 2 | 6.5 | 18 | 0 | 0 | 0 | 2 |
| shore A hardness at −10° C. | 80.5 | 57.5 | 47.5 | 44.5 | 50.5 | 24 | 21 | 2.5 | decomposition |
| shore A hardness at −20° C. | 76.5 | 82 | 34.5 | 58 | 46.5 | 43.5 | nd | nd | nd |
| Rebound resilience (%) | 20 | 45 | 55 | 60 | 45 | 35 | nd | nd | nd |

TABLE 2

|  | TF 10 | TF 11 | TF 12 | TF 13 | TF 14 | TF 15 | TF 16 | TF 17 | TF 18 | TF 19 |
|---|---|---|---|---|---|---|---|---|---|---|
| Ingredients |  |  |  |  |  |  |  |  |  |  |
| HEMA (pbw) | 40 | 40 | 40 | 40 | 35 | 35 | 35 | 35 | 35 | 35 |
| QM203 (pbw) |  |  |  |  | 10 | 10 |  |  |  |  |
| SMA (pbw) |  |  |  |  |  |  | 10 | 10 |  |  |
| Na-AMPS (pbw) |  |  |  |  |  |  |  |  | 10 | 10 |
| Water (pbw) | 9 | 9 | 9 | 9 | 4 | 4 | 4 | 4 | 4 | 4 |
| TEA (pbw) | 1 | 1 | 1 | 1 | 1 | 1 | 1 | 1 | 1 | 1 |
| Water (pbw) | 48 | 48 | 48 | 48 | 48 | 48 | 48 | 48 | 48 | 48 |
| Extra water (pbw) | 0 | 30 | 50 | 80 | 50 | 80 | 50 | 80 | 50 | 80 |
| NAPS (pbw) | 2 | 2 | 2 | 2 | 2 | 2 | 2 | 2 | 2 | 2 |
| Total (pbw) | 100 | 130 | 150 | 180 | 150 | 180 | 150 | 180 | 150 | 180 |
| Results |  |  |  |  |  |  |  |  |  |  |
| Viscosity (without NAPS) | low viscosity | low viscosity | low viscosity | low viscosity | low viscosity | low viscosity | low viscosity | low viscosity | low viscosity | low viscosity |
| Gelling time at 23° C. (min) | 21 | 25 | 29 | 38 | 24 | 27 | 22 | 31 | 29 | 33 |
| T rise (100 g mixture) (° C.) | 71 | 53 | 47 | 42 | 47 | 41 | 52 | 44 | 47 | 41 |
| Gel consistency | rubber/ hard | rubber/ hard | rubber/ soft | rubber/ soft | rubber/ soft | rubber/ soft | rubber/ soft | rubber/ soft | rubber/ soft | rubber/ soft |
| water perfectly absorbed? | yes | yes | yes | yes | residual water* | residual water* | yes | residual water | residual water | residual water |

TABLE 2-continued

|  | TF 10 | TF 11 | TF 12 | TF 13 | TF 14 | TF 15 | TF 16 | TF 17 | TF 18 | TF 19 |
|---|---|---|---|---|---|---|---|---|---|---|
| shore A hardness at 23° C. | 1 | 0 | 0 | 0 | 0 | 0 | 0 | 0 | 0 | 0 |
| shore A hardness at −10° C. | 82.5 | 74 | 55 | 69.5 | 28 | 36 | 13.5 | 5 | 25.5 | 8 |
| shore A hardness at −20° C. | 93 | 80.5 | 53 | nd | nd | nd | 44.5 | nd | nd | nd |
| Rebound resilience (%) | 15 | 20 | 25 | nd | nd | nd | 25 | nd | nd | nd |

*QM203 does not mix completely

TABLE 3

|  | TF 20 | TF 21 | TF 22 | TF 23 | TF 24 |
|---|---|---|---|---|---|
| Ingredients |  |  |  |  |  |
| HEMA (pbw) | 40 | 40 | 40 | 40 |  |
| Creabloc SIS (pbw) |  |  |  |  | 50 |
| PG (pbw) | 5 | 10 | 15 | 20 |  |
| Water (pbw) | 9.5 | 9.5 | 9.5 | 9.5 | 50 |
| TEA (pbw) | 0.5 | 0.5 | 0.5 | 0.5 |  |
| Water (pbw) | 43 | 38 | 33 | 28 |  |
| NAPS (pbw) | 2 | 2 | 2 | 2 |  |
| Total (pbw) | 100 | 100 | 100 | 100 | 100 |
| Results |  |  |  |  |  |
| Viscosity (without NAPS) | low viscosity | low viscosity | low viscosity | low viscosity | soaked |
| Gelling time at 23° C. (min) | 35 | 33 | 35 | 34 | powder, |
| T rise (100 g mixture) (° C.) | 67 | 68 | 67 | 71 | continuous |
| Gel consistency | rubber | rubber | rubber/soft | rubber/soft | hydrogel |
| water perfectly absorbed? | yes | yes | yes | yes | not formed |
| shore A hardness at 23° C. | 0 | 0 | 0 | 0 |  |
| shore A hardness at −10° C. | 0.5 | 2 | 1 | 0 |  |
| shore A hardness at −20° C. | 55 | 31 | 8.5 | 3.5 |  |
| Rebound resilience (%) | 30 | 40 | 40 | 30 |  |

The invention claimed is:

1. A method for producing a tire filled with a (meth)acrylic hydrogel, the method comprises
    a) providing a mixture comprising at least one water-soluble (meth)acrylic compound, water and an initiator, and
    b) filling the mixture in the tire in which the mixture polymerizes to form the (meth)acrylic hydrogel.

2. The method according to claim 1, wherein the weight ratio of the at least one (meth)acrylic compound to water in the mixture is in the range of 0.3 to 4.

3. The method according to claim 1, wherein the mixture contains from 20 to 80% by weight of water, and from 80 to 20% by weight of at least one water-soluble (meth)acrylic compound.

4. The method according to claim 1, wherein the mixture comprises at least one water-soluble (meth)acrylic compound having one (meth)acryloyl group or the mixture comprises at least one water-soluble (meth)acrylic compound having one (meth)acryloyl group and at least one water-soluble (meth)acrylic compound having two or more (meth)acryloyl groups.

5. The method according to claim 1, wherein the water-soluble (meth)acrylic compound is selected from at least one of a hydroxyl-functional (meth)acrylate, a carboxyl-functional (meth)acrylic compound, a salt or an anhydride of a carboxyl-functional (meth)acrylic compound, a polyether (meth)acrylate, a (meth)acrylamide, a (meth)acrylate having a sulfonic acid group, a (meth)acrylamide having a sulfonic acid group, a salt or an ester of a (meth)acrylate having a sulfonic acid group or of a (meth)acrylamide having a sulfonic acid group, a (meth)acrylate having a quaternary nitrogen containing group and a (meth)acrylamide having a quaternary nitrogen containing group or mixtures thereof.

6. The method according to claim 1, wherein the mixture comprises an accelerator.

7. The method according to claim 1, wherein the mixture comprises an antifreezing agent.

8. The method according to claim 1, wherein the total weight of water-soluble (meth)acrylic compounds, water and, if present, antifreezing agent in the mixture is in the range of from 99.8 to 80% by weight.

9. The method according to claim 1, wherein the (meth)acrylic hydrogel formed has a shore A hardness at 23° C. of not more than 50 and/or a shore A hardness at −10° C. of not more than 60.

10. A tire filled with a (meth)acrylic hydrogel, wherein the (meth)acrylic hydrogel consists of:
    (i) (meth)acrylic polymers containing repeating units having pendant groups, each pendant group being independently a carboxylate group or a carboxylate ester group,
    (ii) water, and
    (iii) optionally at least one component selected from the group consisting of an initiator, an accelerator, an antifreezing agent, an inhibitor, a diluent, and a filler.

11. The tire according to claim 10, obtainable by a method comprising:
    a) providing a mixture comprising at least one water-soluble (meth)acrylic compound, water and an initiator, and
    b) filling the mixture in the tire in which the mixture polymerizes to form the (meth)acrylic hydrogel.

12. The tire according to claim 10, which is a tire for a transportation vehicle.

13. The tire according to claim 10, wherein the (meth) acrylic hydrogel is formed by polymerizing a mixture containing 20 to 80% by weight of at least one water-soluble (meth)acrylic compound, based on a total weight of the mixture.

14. The tire according to claim 13, wherein the at least one water-soluble (meth)acrylic compound is selected from the group consisting of a hydroxyl-functional (meth)acrylate, a carboxyl-functional (meth)acrylic compound, a salt or an anhydride of a carboxyl-functional (meth)acrylic compound, a polyether (meth)acrylate, a (meth)acrylate having a sulfonic acid group, and a salt or an ester of a (meth) acrylate having a sulfonic acid group.

15. The tire according to claim 14, wherein the (meth) acrylic hydrogel has a shore A hardness at 23° C. of not more than 50 and/or a shore A hardness at −10° C. of not more than 60.

16. The tire according to claim 10, wherein the (meth) acrylic hydrogel is formed by polymerizing a mixture consisting of at least one water-soluble (meth)acrylic compound, water, an initiator, optionally an accelerator, optionally an antifreezing agent, and optionally an inhibitor.

\* \* \* \* \*